(12) United States Patent
Koury et al.

(10) Patent No.: US 8,746,283 B2
(45) Date of Patent: Jun. 10, 2014

(54) FAUCET DIVERTER VALVES

(75) Inventors: Steffen Koury, Everett, MA (US);
James McGee, Chelsea, MA (US);
Chien Hun Yang, New Taipei (TW)

(73) Assignee: Aquasana, Inc., Austin, TX (US)

( * ) Notice: Subject to any disclaimer, the term of this patent is extended or adjusted under 35 U.S.C. 154(b) by 88 days.

(21) Appl. No.: 13/252,038

(22) Filed: Oct. 3, 2011

(65) Prior Publication Data
US 2013/0081723 A1 Apr. 4, 2013

(51) Int. Cl.
*F16K 11/065* (2006.01)
*F16K 11/078* (2006.01)
*B01D 35/00* (2006.01)

(52) U.S. Cl.
USPC ............ 137/867; 137/872; 239/25; 210/420; 210/433.1; 210/456

(58) Field of Classification Search
USPC ......... 137/625.5, 801, 867, 868, 872; 239/25; 210/420, 421, 433.1, 456
See application file for complete search history.

(56) References Cited

U.S. PATENT DOCUMENTS

| | | | | |
|---|---|---|---|---|
| 2,285,010 | A | * | 6/1942 | Bullock ........................ 251/101 |
| 3,690,965 | A | | 9/1972 | Bergh et al. ................... 438/500 |
| 5,083,589 | A | * | 1/1992 | Wilcock ................... 137/625.29 |
| 5,795,475 | A | | 8/1998 | Luedke et al. ............. 210/257.2 |
| 6,058,971 | A | | 5/2000 | Palmer et al. ............. 137/599.11 |
| 6,135,154 | A | * | 10/2000 | Chen et al. ............... 137/625.29 |
| 6,220,298 | B1 | * | 4/2001 | Wu ............................... 137/801 |
| 7,252,757 | B2 | * | 8/2007 | Warren et al. ................... 210/87 |
| 8,015,997 | B2 | * | 9/2011 | Bass et al. ...................... 137/883 |
| 2004/0123911 | A1 | | 7/2004 | Bartkus et al. ........... 137/625.46 |

OTHER PUBLICATIONS

ANAXON Industry Company Ltd., "Product Line: Diverter Valve 1138DB", http://anaxon.com/cgi-bin/productfn/pdt_detail_1st.pl?ProdID=151, accessed via web.archive.org on Aug. 19, 2013, but believed to be as available and archived on Jul. 19, 2007.

* cited by examiner

*Primary Examiner* — John Fox
*Assistant Examiner* — Seth W Mackay-Smith
(74) *Attorney, Agent, or Firm* — Fulbright & Jaworski LLP

(57) ABSTRACT

Faucet diverter valves for use, for example, with faucets and water filtration systems.

9 Claims, 6 Drawing Sheets

FAUCET DIVERTER VALVES

BACKGROUND

1. Field of the Invention

The present invention relates generally to valves, more particularly, but not by way of limitation, to diverter valves for faucets (e.g., for diverting water to a filter for filtration).

2. Description of Related Art

Examples of diverter valves are disclosed in: (1) U.S. Pat. Nos. 6,058,971; (2) 5,795,475; (3) 5,083,589; (4) 3,690,965; and (5) U.S. patent application Ser. No. 10/627,062, filed Jul. 25, 2003, and (5) published as Pub. No. US 2004/0123911.

SUMMARY

The present disclosure includes embodiments of faucet diverter valves.

Some embodiments of the present faucet diverter valves comprise: a body comprising a primary inlet, a primary outlet, an intermediate outlet, a secondary inlet, and a secondary outlet in fluid communication with the secondary inlet through the body; a plunger coupled to the body and configured to be moved between a first position permitting fluid communication between the primary inlet and the primary outlet, and a second position permitting fluid communication between the primary inlet and the intermediate outlet; and a handle pivotally coupled to the body and configured such that a portion of the handle can be depressed to cause the plunger to move from the first position to the second position.

In some embodiments, the handle is also pivotally coupled to the plunger. In some embodiments, the handle is configured such that a portion of the handle can be depressed to move the plunger from the first position to the second position. In some embodiments, the plunger includes a stem portion coupled to the handle, and a head configured to prevent fluid communication between the primary inlet and the intermediate outlet if the plunger is in the first position. In some embodiments, the primary outlet has a longitudinal axis, and the secondary outlet has a longitudinal axis that is substantially parallel to the longitudinal axis of the primary outlet. In some embodiments, the secondary outlet is smaller than the primary outlet. In some embodiments, the intermediate outlet is configured to be coupled to the inlet of a filter assembly, and the secondary inlet is configured to be coupled to the outlet of the filter assembly, such that if the plunger is in the second position water can be directed from the primary inlet to the secondary outlet through the filter assembly. In some embodiments, the body includes a secondary flowpath between the secondary inlet and the secondary outlet, and a primary flowpath between the primary inlet and the primary outlet, and the primary flowpath extends through the secondary flowpath.

Some embodiments of the present faucet diverter valves comprise: a body comprising a primary inlet, a primary outlet, an intermediate outlet, a secondary inlet, and a secondary outlet in fluid communication with the secondary inlet through the body; and a plunger coupled to the body and configured to be moved between a first position configured to direct permit fluid communication between the primary inlet and the primary outlet, and a second position configured to permit fluid communication between the primary inlet and the intermediate outlet; where the body includes a secondary flowpath between the secondary inlet and the secondary outlet, and a primary flowpath between the primary inlet and the primary outlet, and the primary flowpath extends through the secondary flowpath.

Some embodiments further comprise, a handle pivotally coupled to the body and configured such that a portion of the handle can be depressed to cause the plunger to move from the first position to the second position. In some embodiments, the handle is also pivotally coupled to the plunger. In some embodiments, the handle is configured such that a portion of the handle can be depressed to move the plunger from the first position to the second position. In some embodiments, the plunger includes a stem portion coupled to the handle, and a head configured to prevent fluid communication between the primary inlet and the intermediate outlet if the plunger is in the first position. In some embodiments, the primary outlet has a longitudinal axis, and the secondary outlet has a longitudinal axis that is substantially parallel to the longitudinal axis of the primary outlet. In some embodiments, the secondary outlet is smaller than the primary outlet. In some embodiments, the intermediate outlet is configured to be coupled to the inlet of a filter assembly, and the secondary inlet is configured to be coupled to the outlet of the filter assembly, such that if the plunger is in the second position water can be directed from the primary inlet to the secondary outlet through the filter assembly.

Any embodiment of any of the present devices can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

The term "coupled" is defined as connected, although not necessarily directly, and not necessarily mechanically; two items that are "coupled" may be unitary with each other unless the context explicitly requires that they be separate structures. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a device or system that is configured in a certain way is configured in at least that way, but it can also be configured in other ways than those specifically described.

Figure 7:
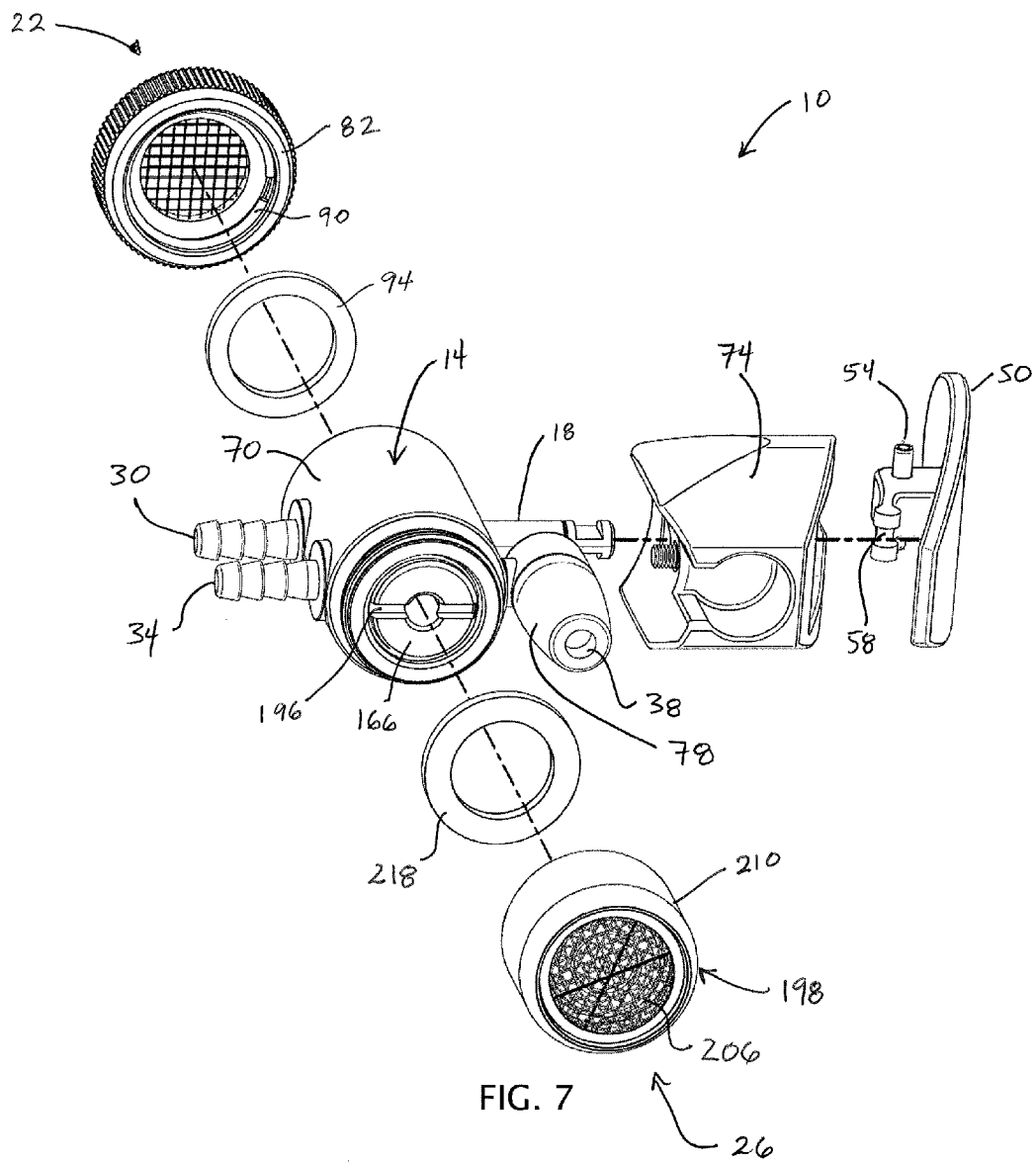
FIG. 7 is an exploded perspective view of the diverter valve of FIG. 1.
Figure 8:
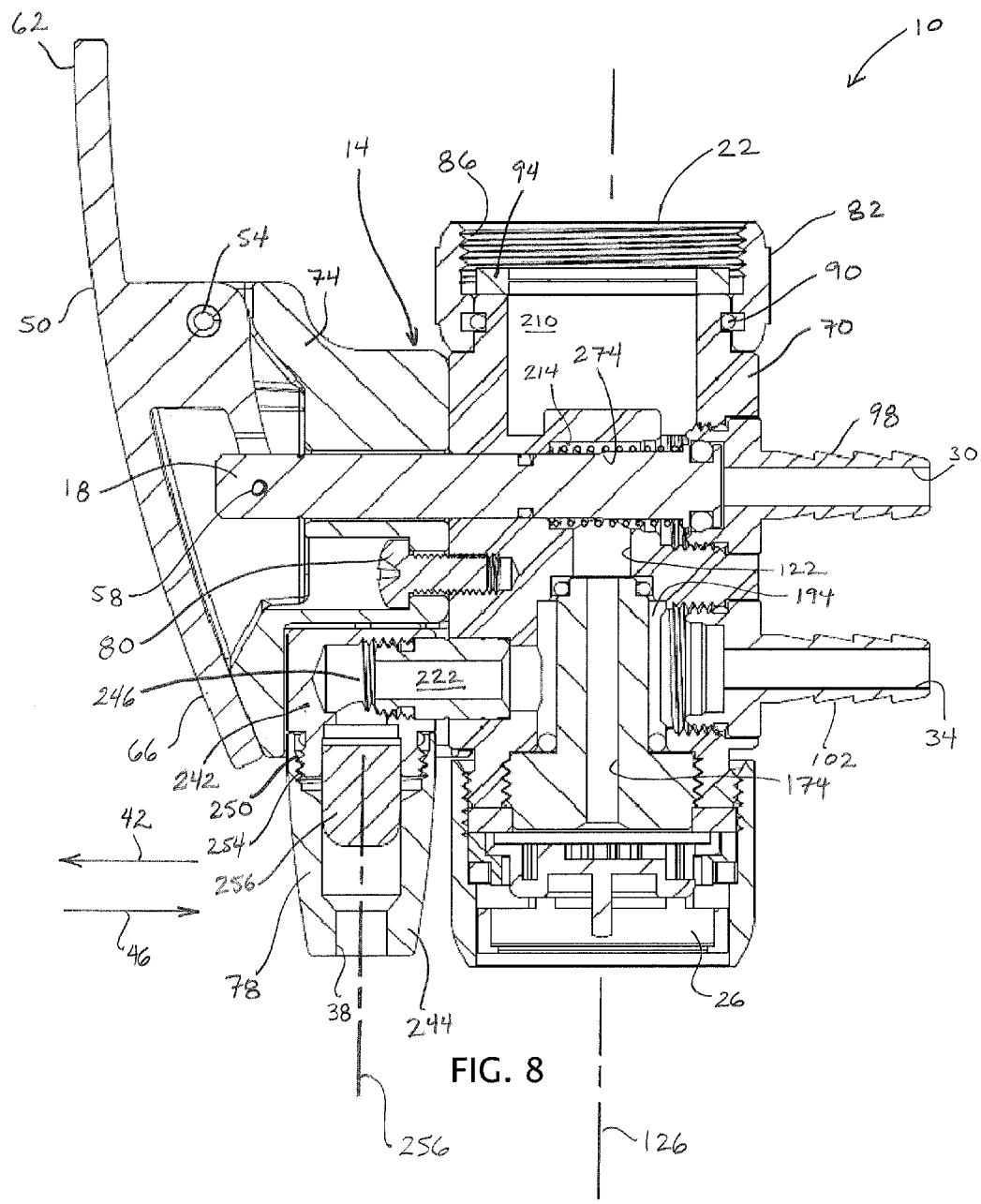
FIG. 8 is a cross-sectional view of the diverter valve of FIG. 1, showing a plunger of the valve in a first position.
Figure 9:
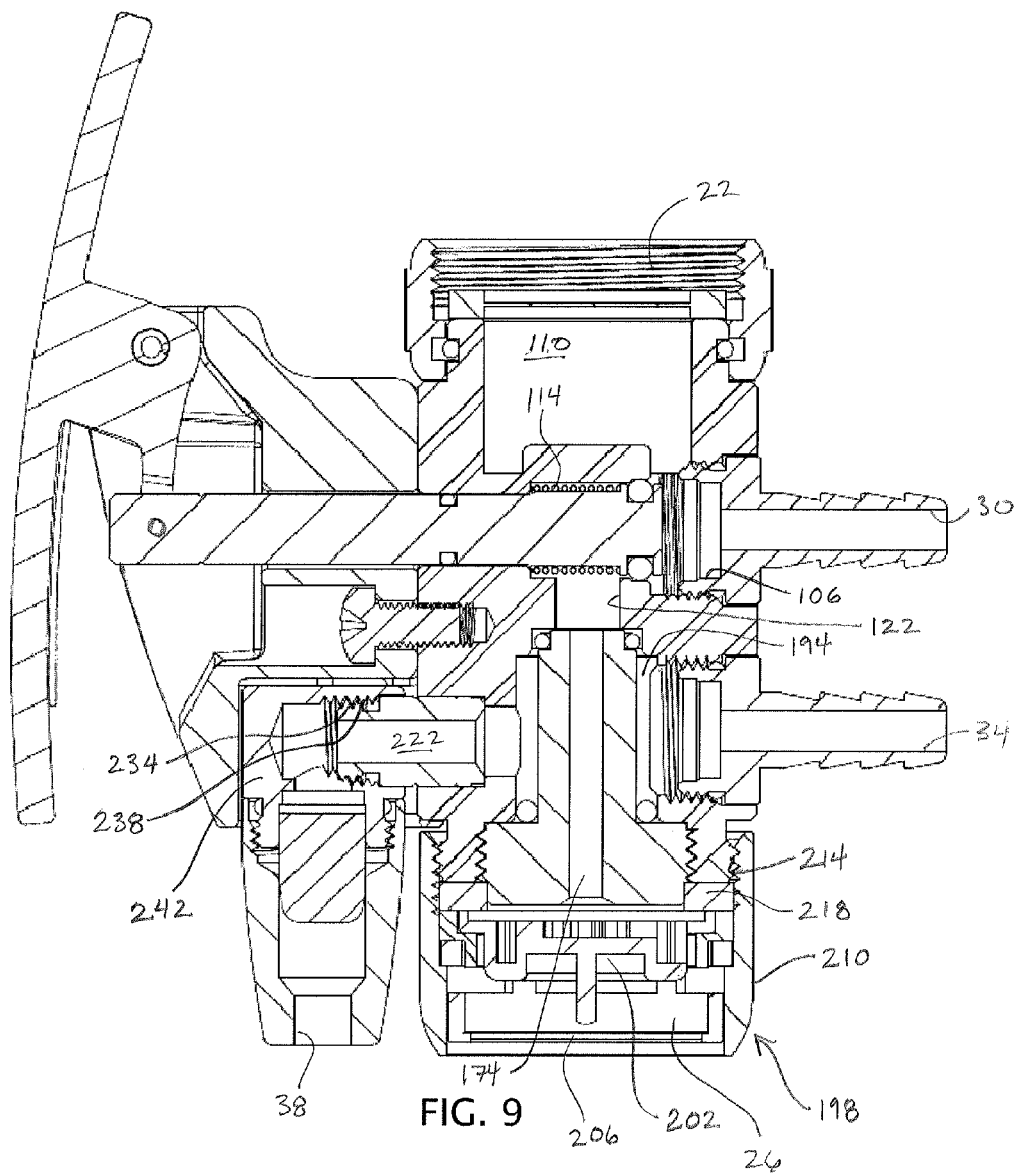
FIG. 9 is a cross-sectional view of the diverter valve of FIG. 1, showing the plunger of the valve in a second position.
Figure 10:
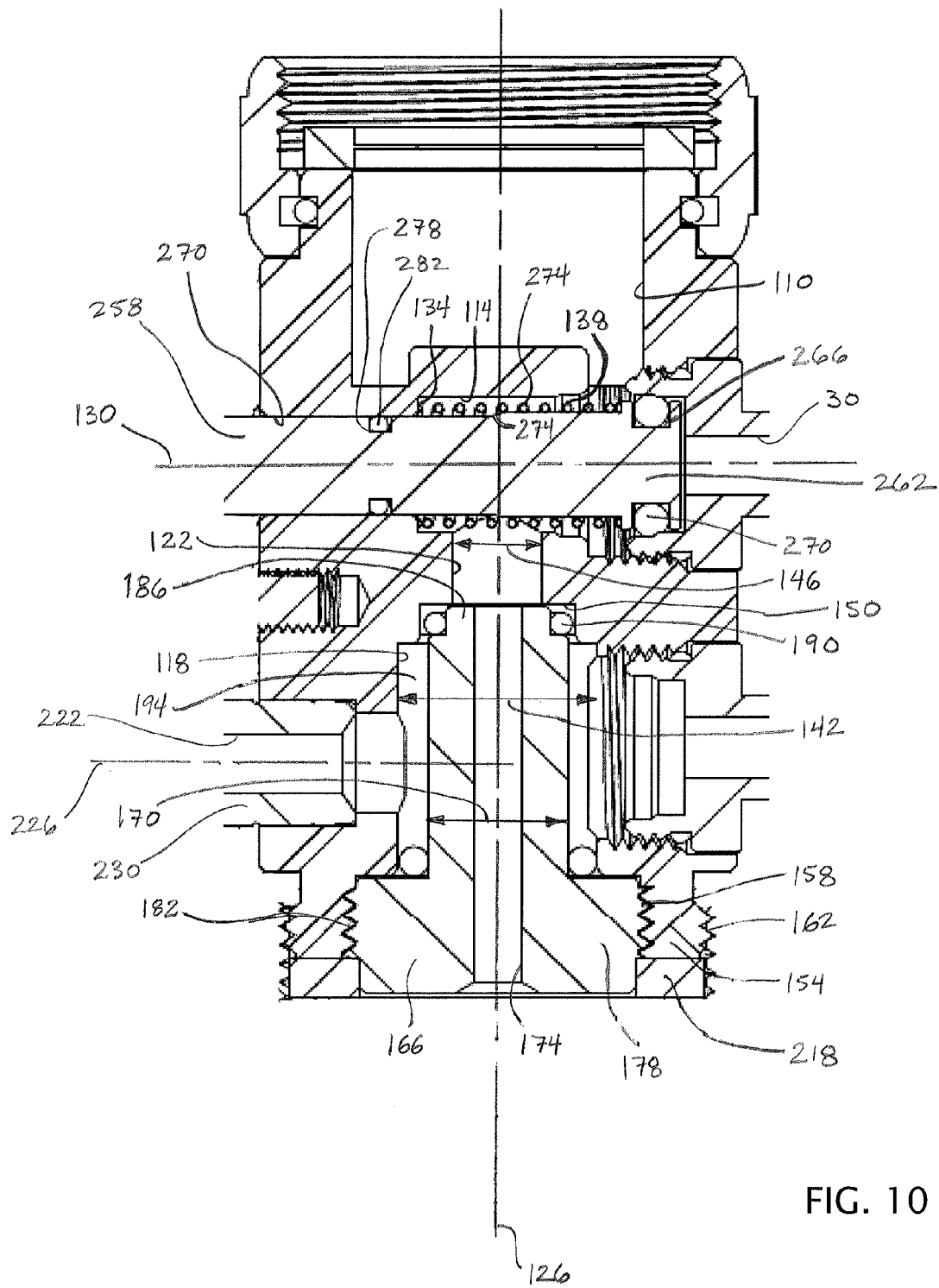
FIG. 10 is an enlarged cross-sectional view of a portion of the diverter valve of FIG. 1, showing the plunger of the valve in the first position.

Referring now to the drawings, and more particularly to FIGS. 1-8, shown therein and designated by the reference numeral 10 is an embodiment of the present diverter valves. In the embodiment shown, valve 10 comprises a body 14 and a plunger 18 (FIG. 7). Body 14 comprises a primary inlet 22, a primary outlet 26, an intermediate outlet 30, a secondary inlet 34, and a secondary outlet 38 in fluid communication with secondary inlet 34 through body 14. In the embodiment shown, plunger 18 is coupled to body 14 and configured to be moved between a first position (FIG. 8) permitting fluid communication between the primary inlet and the primary outlet, and a second position permitting fluid communication between the primary inlet and the intermediate outlet (FIG. 9). For example, if in the first position, plunger 18 can be moved in direction 42 to the second position; and if in the second position, plunger 18 can be moved in direction 46 to return the plunger to the first position, as described in more detail below. In the embodiment shown, valve 10 further comprises a handle 50 coupled to body 14 and configured such that a portion of handle 50 can be depressed to cause plunger 18 to move from the first position (shown in FIG. 8) in direction 42 to the second position (FIG. 9).

In the embodiment shown, handle 50 is pivotally coupled to body 14 via pin 54, and is pivotally coupled to plunger 18 via pin 58. In other embodiments, handle 50 can be coupled to body 14 and/or plunger 18 by any suitable structure (e.g., ball-and-socket joint, etc.) that permits valve 10 to function as described in this disclosure. In the embodiment shown, handle 50 is configured such that a first portion 62 of the handle can be depressed (in direction 46) to move plunger 18 from the first position (shown in FIG. 8) to the second position (shown in FIG. 9). More particularly, in the embodiment shown, depressing first portion 62 causes handle 50 to pivot around pin 54 and raise a second portion 66 of handle 50 relative to body 14, such that second portion 66 pulls or raises plunger 18 relative to body 14 in direction 42. In the embodiment shown, the diverter valve is configured so that plunger 18 is not exposed when in the first position.

In the embodiment shown, body 14 includes a cylindrical primary portion 70, a handle base portion 74, and a secondary nozzle portion 78. In the embodiment shown, handle base portion 74 is coupled to primary portion by a screw 80, and secondary nozzle portion 78 is coupled to primary portion 70 by via a press-fit member (230, described in more detail below). Although portions 70, 74, and 78 are shown as distinct parts, in other embodiments, any two or more of portions 70, 74, and 78 can be of unitary construction (e.g., portions 70 and 74 can be a single piece). For example, in some embodiments, primary portion 70 and secondary nozzle portion 78 can be manufactured (e.g., machined, molded, etc.) as a single, unitary piece of material. Handle base portion 74 is configured to help keep plunger 18 from not being exposed when in the plunger is in the first position.

Figure 1:
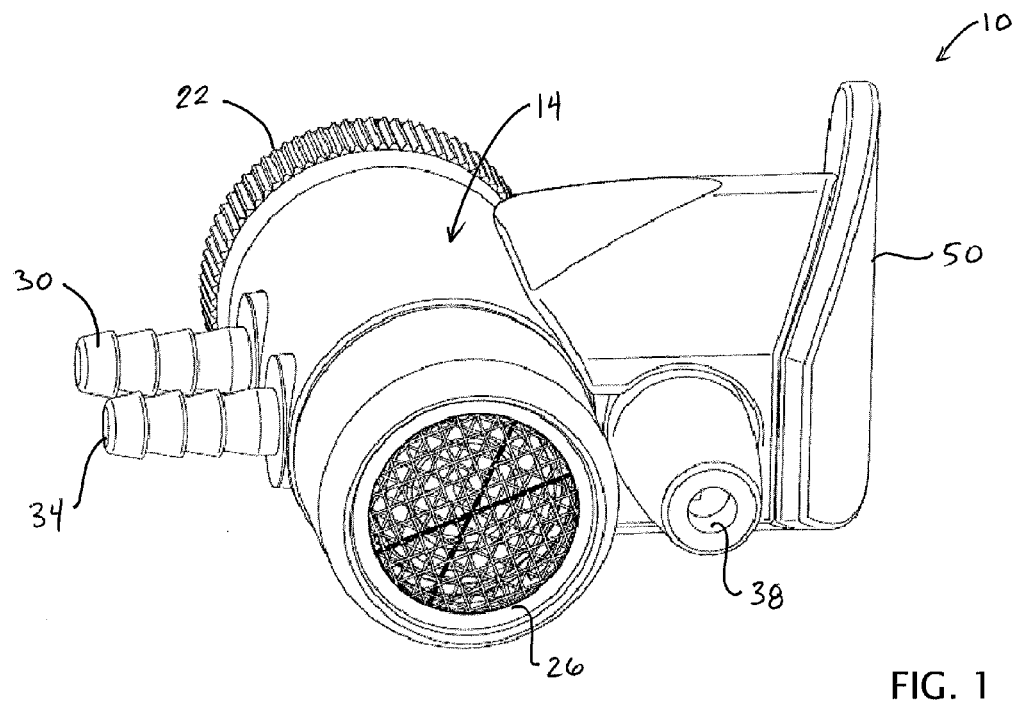
FIG. 1 is a perspective view of one of the present diverter valves.
Figure 2:
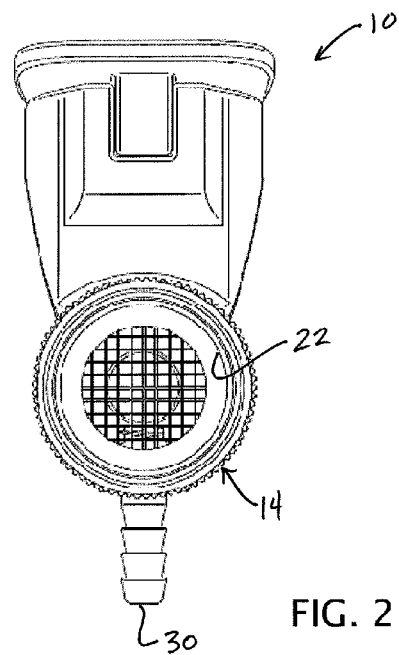
FIG. 2 is a top view of the diverter valve of FIG. 1.
Figure 3:
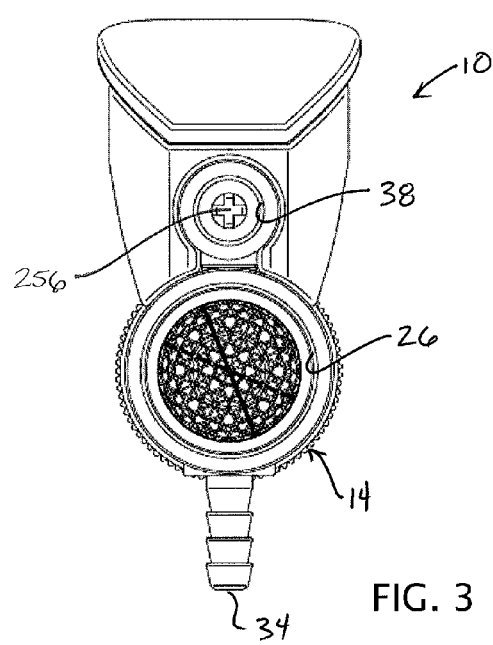
FIG. 3 is a bottom view of the diverter valve of FIG. 1.
Figure 6:
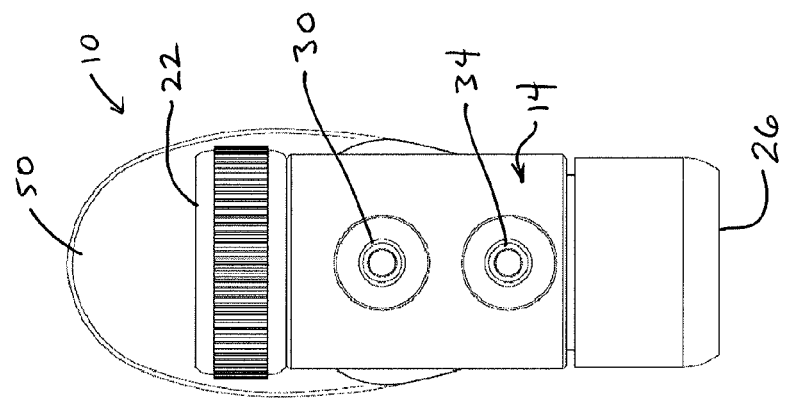
FIG. 6 is a back side view of the diverter valve of FIG. 1.
Figure 5:
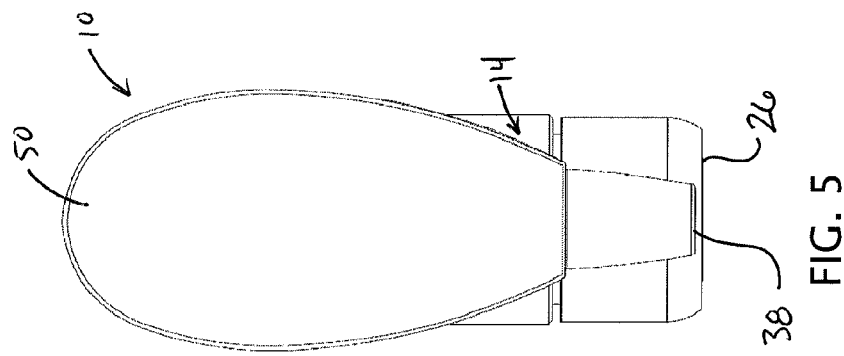
FIG. 5 is a front side view of the diverter valve of FIG. 1.
Figure 4:
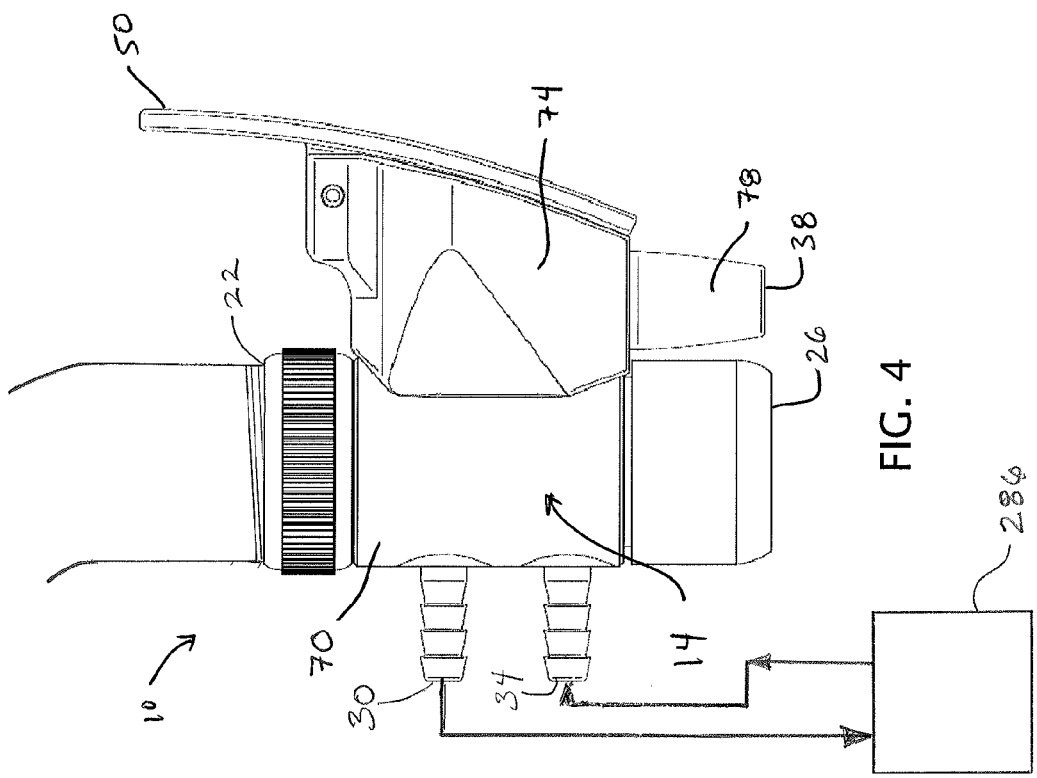
FIG. 4 is a left side view of the diverter valve of FIG. 1.

In the embodiment shown, body 14 (portion 70) includes a coupling ring 82 with female threads 86 configured to couple valve 10 to corresponding male threads of a faucet or the like (as illustrated in FIG. 4). In the embodiment shown, coupling ring 82 is rotatably coupled to primary portion 70 of body 14 by a snap-ring 90 or other similar structure (extending in and between corresponding recesses in portion 70 of body 14 and ring 82, as shown), and comprises an O-ring or other gasket 94 configured to provide a water-tight seal between valve 10 and a faucet to which the valve is coupled. In other embodiments, valve 10 can be configured to be coupled to a water source (e.g., a faucet) by any suitable structure (e.g., a snap fitting or the like).

In the embodiment shown, valve 10 comprises a first nipple 98 defining intermediate outlet 30, and a second nipple 102 defining secondary inlet 34. In the embodiment shown, nipples 98 and 102 are coupled to the body by threaded connections; however, in other embodiments the nipples may be unitary with the body (e.g., with primary portion 70). In the embodiment shown, the base of nipple 98 includes an enlarged recess 106 in communication with intermediate outlet 30, and configured to receive a portion of plunger 18 to seal intermediate outlet 30 when the plunger is in the first position (FIG. 8). Stated another way, the interior portion of nipple 98 that defines recess 106 acts as a valve seat for plunger 18 to seal intermediate outlet 30 when plunger 18 is in the first position.

In the embodiment shown, body 14 includes an inlet chamber 110, a valve chamber 114 configured in communication with inlet chamber 110 if plunger 18 is in the first position, an outlet chamber 118, and a passage 122 extending between valve chamber 114 and outlet chamber 118. In the embodiment shown, inlet chamber 110 is cylindrical and centered around an axis that is parallel to (e.g., collinear, in the embodiment shown) with the longitudinal axis 126 of primary portion 70 of the body. In the embodiment shown, valve chamber 114 is also cylindrical, but is centered around an axis 130 that is substantially perpendicular to axis 126 and extends through intermediate outlet 30. In the embodiment shown, the body defines a shoulder 134 at a first end of valve chamber 114, and an enlarged recess 138 extending into a second end of the valve chamber. As with recess 106, recess 138 is sized to receive a portion of plunger 18 to seal the passage between valve chamber 114 and inlet chamber 110 (e.g., such that the portion of the body defining recess 138 acts as a valve seat to enable the plunger to seal the entry to valve chamber). In the embodiment shown, channel 122 and outlet chamber 118 are each cylindrical and centered on axis 126, with outlet chamber 118 having a diameter 142 that is greater than diameter 146 of channel 122. In the embodiment shown, the body defines an enlarged recess 150 at the end of channel 122 adjacent outlet chamber 118.

In the embodiment shown, outer end 154 of outlet chamber 118 includes both inner female threads 158 and outer male threads 162 (the threads in these examples may comprise a single thread, even when worded as "threads"). Outlet chamber 118 is configured to receive an outlet member 166 having an elongated body with an outer diameter 170, elongated central channel 174, and an enlarged discharge end 178 having male threads 182 sized to correspond to female threads 158 to retain outlet member 166. In the embodiment shown, central channel 174 is cylindrical and centered around axis 126. Outlet member 166 is configured to extend through outlet chamber 118 such that a first end 186 extends into recess 150 to provide a seal (e.g., via O-ring or other gasket 190) between end 186 and the portion of the body defining recess 150 such that liquid flowing from valve chamber 114 through channel 122 will be directed into channel 122. As shown, diameter 170 of outlet member 160 is less than diameter 142 of outlet chamber 118, such that an annular passage 194 is defined in outlet chamber 118 around member 166. In the embodiment shown, the discharge end of member 166 includes a slot 196 configured to receive a flat-head screwdriver to screw member 166 into and/or out of primary portion 70 of body 14.

In the embodiment shown, valve 10 also comprises a diffuser assembly 198 that includes a nozzle 202, a screen 206, and a retainer 210. Nozzle 202 is configured to be coupled to body 10 at the discharge end of channel 174 such that if liquid exits channel 174, the liquid will pass through nozzle 202. Screen 206 is coupled to retainer 210 such that if liquid exits nozzle 202, the liquid will pass through screen 206. Retainer 210 includes female threads 214 corresponding to male threads 162 of primary portion 70, such that retainer 210 can be coupled to the body to hold nozzle 202 and screen 206 relative to the body. In the embodiment shown, assembly 198 also includes an O-ring or other gasket 218.

As discussed above, nipple 102 defines secondary inlet 34. As shown, intermediate inlet 34 is in fluid communication with annular passage 194. In the embodiment shown, body 14 includes channel 222 in fluid communication with annular passage 194. In the embodiment shown, channel 222 is cylindrical and centered around an axis 226 that is perpendicular to axis 126, and that passes through secondary inlet 34 such that if liquid (e.g., water) is returned from a filtration system connected to the diverter valve between intermediate outlet 30 and secondary inlet 34, the liquid will enter annular passage 194 through secondary inlet 34, and will exit annular passage 194 through channel 222. In the embodiment shown, channel 222 is defined by a cylindrical member 230 configured to be press-fit into a correspondingly-sized recess 210 of primary portion 70. In other embodiments, member 230 can be unitary with primary portion 70 and/or with outlet portion 78 of the body. In the embodiment shown, member 230 includes male threads 234 configured to correspond with female threads 238 of outlet portion 78 of body 14. In the embodiment shown, outlet portion 78 includes a right-angle member 242 and a nozzle member 244. Right-angle member 242 includes a channel 246 having two arms angled relative to one another, female threads 238 disposed on a first one of the two arms of channel 246, and male threads 250 disposed on the other of the two arms of channel 246. Nozzle member 244 includes female threads 254 corresponding to male threads 250 to couple nozzle member 244 to right-angle member 242. In the embodiment shown, nozzle member 244 has a longitudinal axis 256 that is substantially parallel to axis 126 (which is also a longitudinal axis of primary outlet 26). Although member 242 is described as a right-angle member in the depicted embodiment, member 242 can be provided with any suitable angle between the two arms of channel 246. In the embodiment shown, valve 10 also includes a t or + shaped flow splitter 256 disposed in nozzle member 244.

In the embodiment shown, plunger 18 includes a stem portion 258 and a head portion 262. Head portion 262 includes a peripheral recess 266 and an O-ring or other gasket 270 disposed in recess 266, and plunger 18 is biased in direction 46 (toward the first position of FIG. 8) by a spring 274 disposed between shoulder 134 and head portion 262. As shown, head portion 262 is configured to extend into recess 106 such that head portion 262 and/or O-ring 270 seal intermediate outlet 30 when plunger 18 is in the first position (FIG. 8), and to extend into recess 138 such that head portion 262 and/or O-ring 266 seal the entrance to valve chamber 114 when plunger 18 is in the second position (FIG. 9). In the embodiment shown, body 14 (and, more particularly, primary portion 70 and handle base portion 74) includes a stem channel 270 that extends from valve chamber 214 through the body, and is configured to slidably receive stem portion 258 such that stem portion 258 can extend from valve chamber 214 out of the body to be pivotally coupled to handle 50 at pin 58. In the embodiment shown, stem portion 258 includes a shoulder 274 configured to limit travel of the plunger 18 relative to body 14. For example, in the embodiment shown, shoulder 274 has a diameter that is larger than the diameter of stem channel 270. In the embodiment shown, stem portion 258 also includes a recess 278 configured to receive an O-ring or other gasket 282 to seal between the stem portion and the body, and thereby substantially prevent leakage of liquid from valve chamber 214 through stem channel 270.

In operation, primary inlet 22 is configured to be coupled to a liquid source (e.g., a faucet), intermediate outlet 30 is configured to be coupled to the inlet of a filter assembly 286, and secondary inlet 34 is configured to be coupled to the outlet of the filter assembly 286, such that if plunger 18 is in the second position (FIG. 9) water can be directed from primary inlet 22 to secondary outlet 38 through the filter assembly. In the embodiment shown, if liquid is provided from the liquid source to primary inlet 22, the liquid can be directed to primary outlet 26 or to secondary outlet 38 via one of two flowpaths. For example, if the plunger is in the first position (FIG. 8), water is directed through a primary flowpath between primary inlet 22 and primary outlet 26 (from primary inlet 22, to inlet chamber 210, to valve chamber 214, through channel 222, through channel 274, to primary outlet 26). If instead the plunger is in the second position (FIG. 9), the liquid is directed from primary inlet 22 and out intermediate outlet 30 to a secondary flowpath between secondary inlet 34 and secondary outlet 38 (from secondary inlet 34, through annular passage 194, to channel 230, and out secondary outlet 38). In the embodiment shown, the primary flowpath (via channel 174 in member 166) passes through the secondary flowpath (annular passage 194).

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, various components may be combined as a unitary structure (e.g., member 70 and member 74 of body 14), connections may be substituted (e.g., threaded connections may be substituted with press-fit or welded connections), and/or components may be omitted (e.g., handle 50 and/or portion 74 may be omitted). Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A faucet diverter valve comprising:
   a body comprising a primary inlet, a primary outlet, an intermediate outlet, a secondary inlet, and a secondary outlet in fluid communication with the secondary inlet through the body;
   a plunger coupled to the body and configured to be moved between a first position permitting fluid communication between the primary inlet and the primary outlet, and a second position permitting fluid communication between the primary inlet and the intermediate outlet; and
   a handle pivotally coupled to the body and configured such that a portion of the handle can be depressed to cause the plunger to move from the first position to the second position;
   where the body includes a secondary flowpath between the secondary inlet and the secondary outlet, and a primary flowpath between the primary inlet and the primary outlet, and the primary flowpath extends through the secondary flowpath.

2. A faucet diverter valve comprising:
   a body comprising a primary inlet, a primary outlet, an intermediate outlet, a secondary inlet, and a secondary outlet in fluid communication with the secondary inlet through the body; and
   a plunger coupled to the body and configured to be moved between a first position configured to direct permit fluid communication between the primary inlet and the primary outlet, and a second position configured to permit fluid communication between the primary inlet and the intermediate outlet;
   where the body includes a secondary flowpath between the secondary inlet and the secondary outlet, and a primary flowpath between the primary inlet and the primary outlet, and the primary flowpath extends through the secondary flowpath.

3. The valve of claim 2, further comprising:
   a handle pivotally coupled to the body.

4. The valve of claim 3, where the handle is also pivotally coupled to the plunger.

5. The valve of claim 4, where the handle is configured such that a portion of the handle can be depressed to cause the plunger to move from the first position to the second position.

6. The valve of claim 5, where the plunger includes a stem portion coupled to the handle, and a head configured to prevent fluid communication between the primary inlet and the intermediate outlet if the plunger is in the first position.

7. The valve of claim 5, where the primary outlet has a longitudinal axis, and the secondary outlet has a longitudinal axis that is substantially parallel to the longitudinal axis of the primary outlet.

8. The valve of claim 7, where the secondary outlet is smaller than the primary outlet.

9. The valve of claim 2, where the intermediate outlet is configured to be coupled to the inlet of a filter assembly, and the secondary inlet is configured to be coupled to the outlet of the filter assembly, such that if the plunger is in the second position water can be directed from the primary inlet to the secondary outlet through the filter assembly.

* * * * *